(12) United States Patent
Hosono et al.

(10) Patent No.: US 6,227,231 B1
(45) Date of Patent: May 8, 2001

(54) PRESSURE/FLOW RATE CONTROL VALVE (75) Inventors: Masayuki Hosono, Toride; Qinghai Yang, Ichikawa, both of (JP)

(73) Assignee: SMC Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/518,927

(22) Filed: Mar. 3, 2000

(30) Foreign Application Priority Data

Mar. 10, 1999 (JP) ................................................. 11-063799
Jul. 14, 1999 (JP) ................................................. 11-200682

(51) Int. Cl.[7] ................................................. F15B 11/04
(52) U.S. Cl. ................................. 137/269.5; 137/505.18; 137/599.09; 137/599.11; 137/601.21
(58) Field of Search ........................... 137/269.5, 505.18, 137/599.09, 599.11, 601.21

(56) References Cited

U.S. PATENT DOCUMENTS

| | | | |
|---|---|---|---|
| 4,147,179 | * 4/1979 | Miura | 137/599.09 |
| 4,171,007 | * 10/1979 | Bouteille | 137/513.7 X |
| 4,197,874 | * 4/1980 | Neff | 137/599.09 |
| 4,271,864 | * 6/1981 | Neff | 137/505.18 X |
| 6,131,610 | * 10/2000 | Morisako et al. | 137/601.21 |

FOREIGN PATENT DOCUMENTS 62-12084   3/1987   (JP) .

* cited by examiner

*Primary Examiner*—Stephen M. Hepperle
(74) *Attorney, Agent, or Firm*—Oblon, Spivak, McClelland, Maier & Neustadt, P.C.

(57) ABSTRACT

Disclosed is a pressure/flow rate control valve comprising a pressure-adjusting section having a valve plug for reducing the pressure of a pressure fluid flowing through a clearance between a hole and itself, a stem which is displaceable integrally with the valve plug and which is installed with a packing, and a spring member which is fastened to one end of the stem, for pressing the valve plug toward an annular projection formed on an inner wall surface of a first valve body.

7 Claims, 11 Drawing Sheets

FIG.13

PRESSURE/FLOW RATE CONTROL VALVE

BACKGROUND OF THE INVENTION

1. Field of the Invention

The present invention relates to a pressure/flow rate control valve which makes it possible to control the pressure and the flow rate of a pressure fluid supplied to or discharged from an actuator such as a cylinder.

2. Description of the Related Art

A pressure/flow rate control valve has been hitherto known, which is used to control the pressure and the flow rate of a pressure fluid supplied to or discharged from an actuator such as a cylinder.

The present applicant has already suggested a flow rate-adjusting valve-equipped pressure control valve which functions as a check valve when the pressure is supplied to a cylinder. The flow rate-adjusting valve-equipped pressure control valve comprises a flow rate-adjusting valve for adjusting the flow rate of the pressure fluid flowing therethrough depending on the opening degree of its valve plug when the pressure fluid is discharged from the cylinder, and a pressure control valve for supplying the pressure fluid with the pressure reduced depending on the force generated by a pressure-adjusting spring when the pressure is supplied to the cylinder, wherein the flow rate-adjusting valve and the pressure control valve are arranged in parallel to one another (see Japanese Utility Model Publication No. 62-12081).

SUMMARY OF THE INVENTION

A general object of the present invention is to provide a pressure/flow rate control valve which makes it possible to adjust the secondary pressure by means of a simple and convenient mechanism, reduce the number of parts, and realize a smaller size and a lighter weight.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

Figure 1:
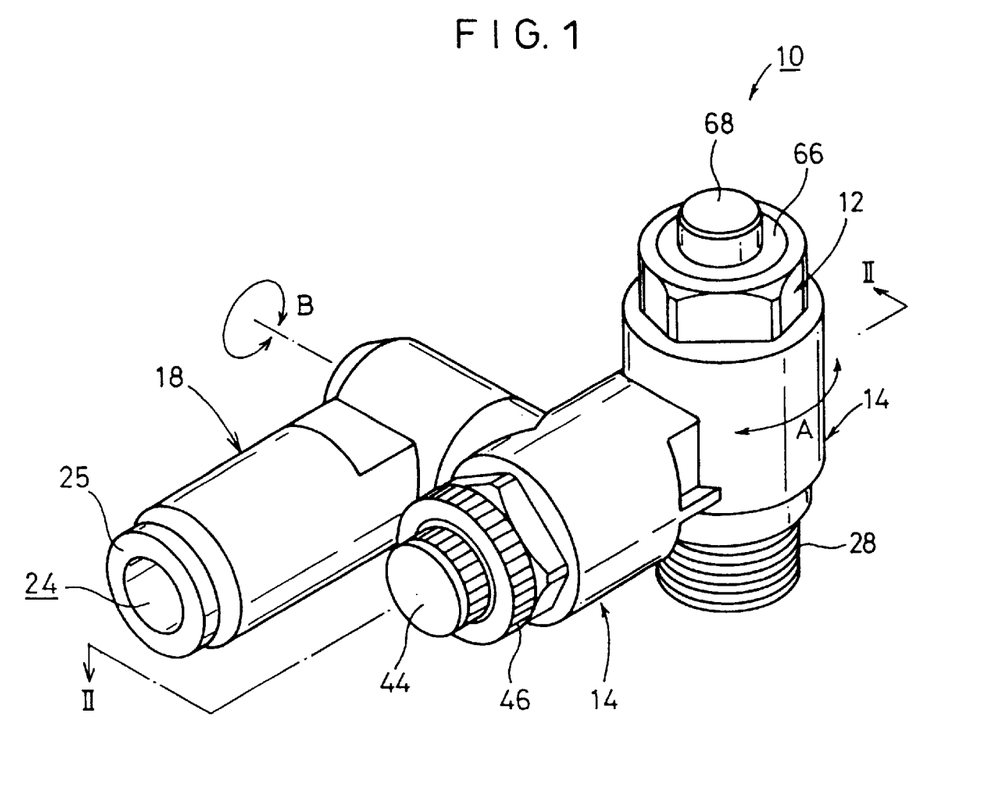
FIG. 1 shows a perspective view illustrating a pressure/flow rate control valve according to an embodiment of the present invention.

With reference to FIG. 1, reference numeral 10 indicates a pressure/flow rate control valve according to an embodiment of the present invention.

The pressure/flow rate control valve 10 comprises a second valve body 14 which is composed of two substantially cylindrical members integrally joined in directions substantially perpendicular to one another and which is rotatable in the direction of the arrow A about a center of rotation of an internally fitted first valve body 12 having a cylindrical configuration, and a third valve body 18 which has a bent substantially L-shaped configuration and which is joined rotatably in the direction of the arrow B about a center of rotation of a projection 16 (see FIG. 2) of the second valve body 14.

Figure 2:
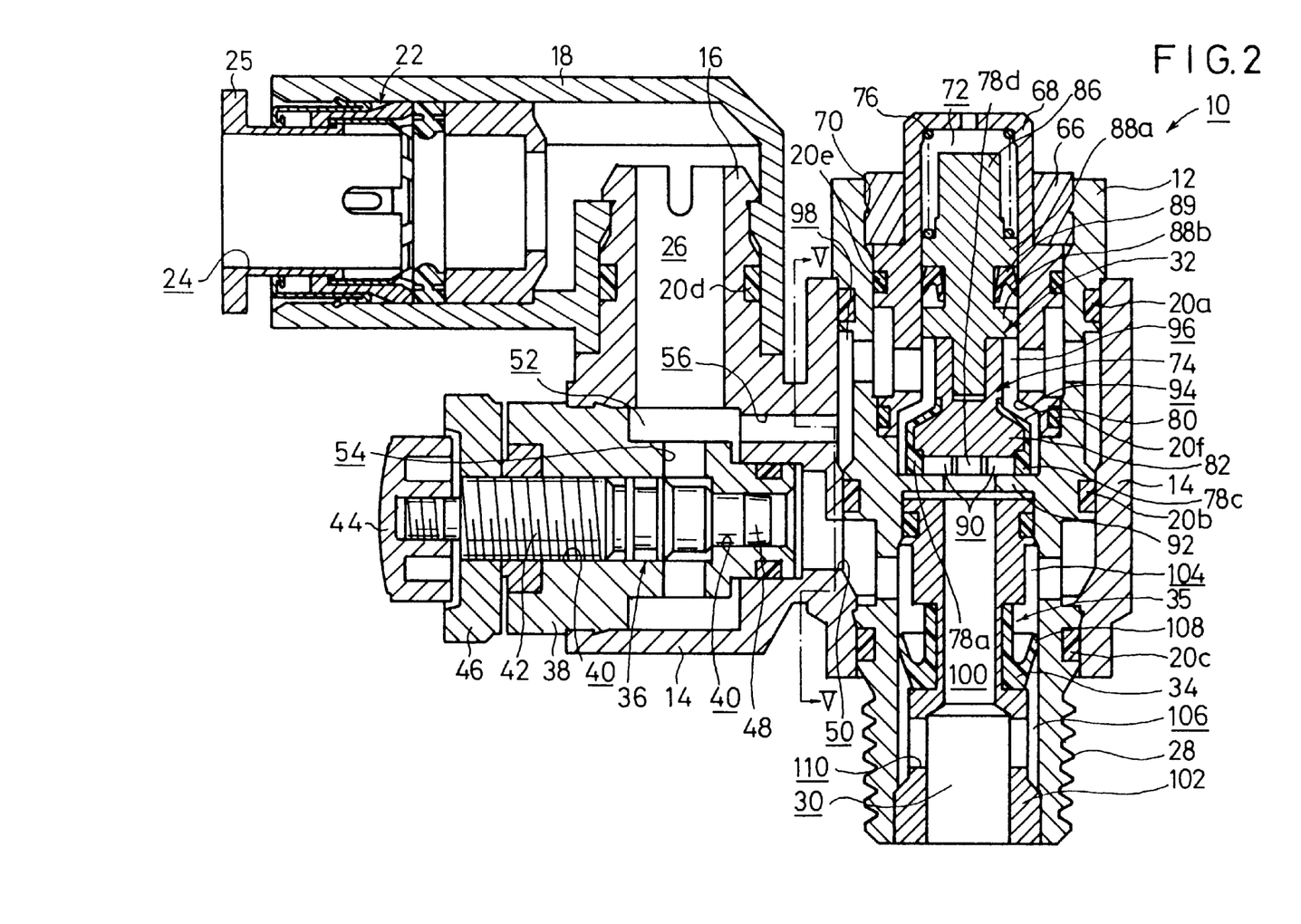
FIG. 2 shows a vertical sectional view taken along a line II—II shown in FIG. 1.

As shown in FIG. 2, ring-shaped first to third seal members 20a to 20c are installed to annular grooves on the outer circumferential surface of the first valve body 12. A ring-shaped fourth seal member 20d is installed to an annular groove on the projection 16 of the second valve body 14.

As shown in FIG. 2, a tube joint section 22, which is connected to a pressure fluid supply source via an unillustrated tube, is provided at one end of the third valve body 18. A known so-called one-touch joint is arranged for the tube joint section 22. The one-touch joint is arranged with a release bush 25 for disengaging the tube from the tube joint section 22 by being pushed, the release bush 25 having a hole which substantially functions as a primary port 24. The third valve body 18 is formed with a first passage 26 which is bent along the third valve body 18 and which communicates with the primary port 24.

A male thread section 28, which is screwed into a port of a cylinder as described later on, is formed on the outer circumferential surface at the lower end of the first valve body 12. A hole, which substantially functions as a secondary port 30, is formed on the inner circumferential surface of the male thread section 28. A pressure-adjusting section 32 for adjusting the pressure of the pressure fluid supplied from the primary port 24 to have a predetermined pressure value, and a check valve section 35 arranged with a check valve 34 are provided substantially coaxially at the inside of the first valve body 12. A flow rate-adjusting section 36, which extends in a direction substantially perpendicular to the axis of the pressure-adjusting section 32 and the check valve section 35, is provided at the inside of the second valve body 14.

The tube joint section 22 and the flow rate-adjusting section 36 may be exchanged with each other so that the tube joint section 22 is arranged in the second valve body 14, and the flow rate-adjusting section 36 is provided in the third valve body 18.

As shown in FIG. 2, the flow rate-adjusting section 36 includes a substantially cylindrical holding member 38 which is internally fitted to the second valve body 14, an adjusting screw member 42 which extends along a stepped through-hole 40 formed at a central portion of the holding member 38 and which is held rotatably in the stepped through-hole 40, a knob section 44 which is joined to a first end of the adjusting screw member 42, and a nut member 46 for fixing the adjusting screw member 42 at a desired position. The first end 48 of the adjusting screw member 42 is formed to have a substantially tapered cross section. The spacing distance between the first end 48 of the adjusting screw member 42 and the inner wall surface of the stepped through-hole 40 is adjusted by increasing or decreasing the screwing amount of the adjusting screw member 42 by the aid of the knob section 44. Therefore, the pressure fluid, which flows through the stepped through-hole 40, is throttled to have a predetermined flow rate in accordance with the spacing distance between the first end 48 of the adjusting screw member 42 and the inner wall surface of the stepped through-hole 40. The first end of the stepped through-hole 40 is formed to make communication with a second passage 50 (second communication passage) formed in the second valve body 14.

An annular first chamber 52 is formed between the outer circumferential surface of the holding member 38 and the inner circumferential surface of the second valve body 14. The first chamber 52 is formed to make communication with the stepped through-hole 40 via a third passage 54 which extends in a direction substantially perpendicular to the stepped through-hole 40. Further, the first chamber 52 is formed to make communication with a fourth passage (first communication passage) 56 which extends substantially in parallel to the stepped through-hole 40.

Figure 5:
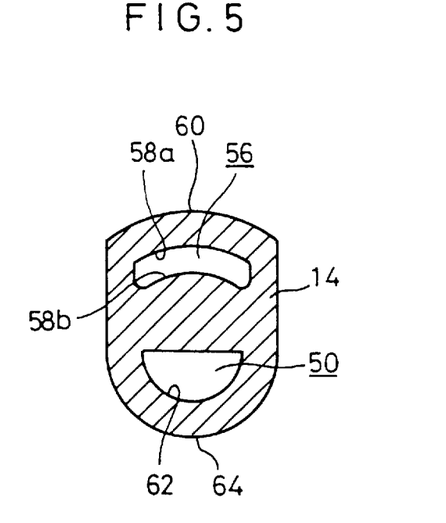
FIG. 5 shows a vertical sectional view taken along a line V—V shown in FIG. 2.

In this embodiment, as shown in FIG. 5, the second passage 50 and the fourth passage 56, which extend substantially in parallel to one another, are formed by being separated vertically from each other by a predetermined spacing distance. An upper inner wall surface 58a and a lower inner wall surface 58b of the fourth passage 56 is formed to have a curved configuration along the upper contour 60 of the second valve body 14. A lower inner wall surface 62 of the second passage 50 is formed to have a semicircular configuration along the lower contour 64 of the second valve body 14. The wall thickness of the second valve body 14 can be reduced, and the entire apparatus is allowed to have a small size and a light weight by forming the second passage 50 and the fourth passage 56 to have the cross-sectional configurations along the upper and lower contours 60, 64 of the second valve body 14 respectively as described above.

As shown in FIG. 2, a bottom-equipped cap member 68 having a cylindrical configuration is held by the aid of a ring member 66 in an upper hole of the first valve body 12. Annular fifth and sixth seal members 20e, 20f are installed to annular grooves between the cap member 68 and the inner wall surface of the first valve body 12. The ring member 66 is fastened to the opening of the first valve body 12 by fastening, to an annular groove, an annular fastening pawl 70 formed on the inner circumferential surface of the first valve body 12.

A valve mechanism 74, which is slidable in the axial direction of the cap member 68, is provided in a second chamber 72 which is surrounded by the cap member 68. The valve mechanism 74 is always in a state of being urged downwardly by the resilient force of a spring member 76 fastened to the inner wall surface of the cap member 68.

In the embodiment of the present invention, the resilient force (spring force) of the spring member 76 is previously set to have a predetermined value. However, an unillustrated thread section may be formed on the cap member 68 to perform the operation based on the screwing system. Accordingly, it is also possible to control the secondary pressure by freely adjusting the resilient force of the spring member 76.

Figure 4:
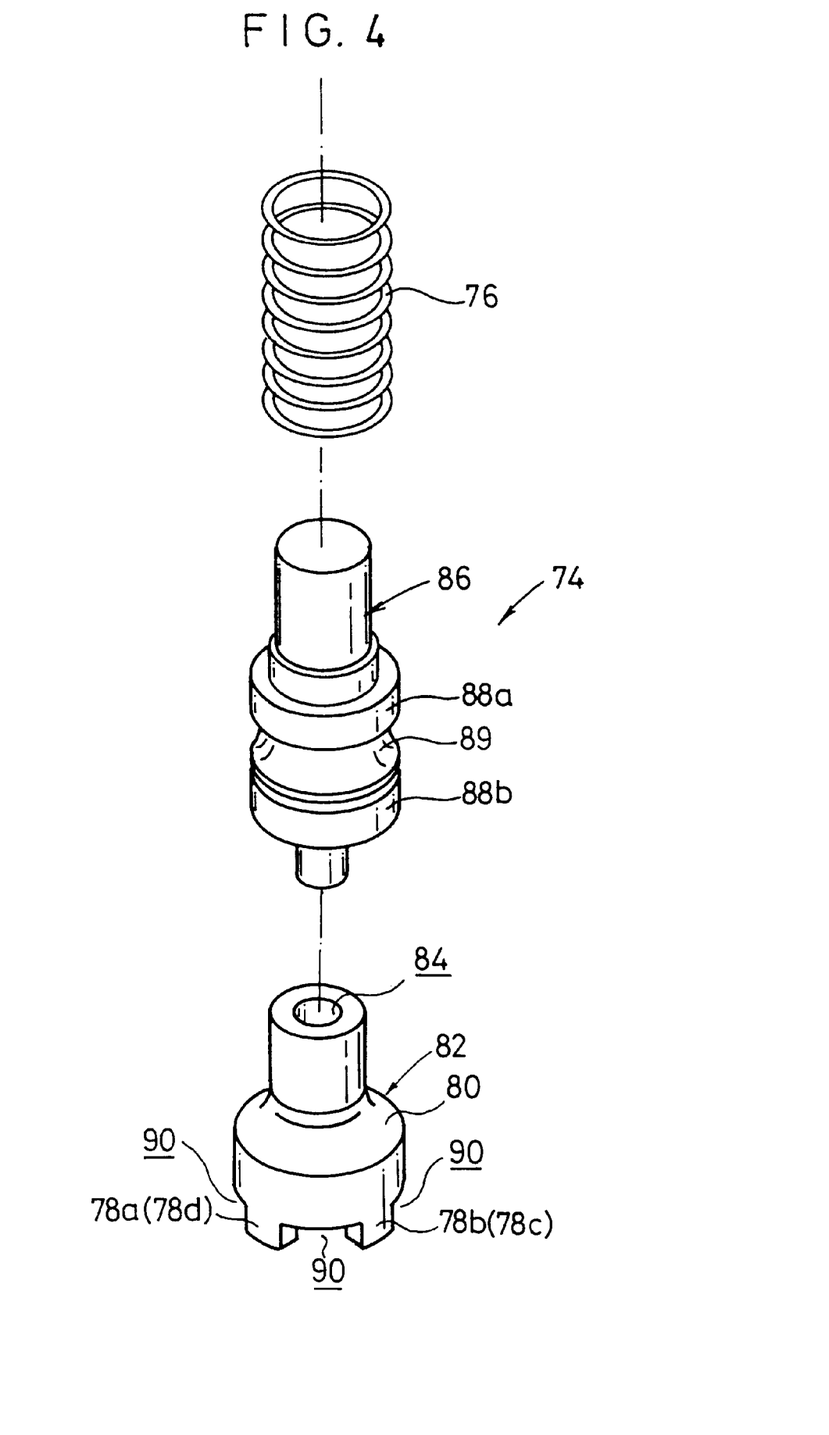
FIG. 4 shows an exploded perspective view illustrating a valve mechanism for constructing the pressure/flow rate control valve shown in FIG. 1.

As shown in FIGS. 2 and 4, the valve mechanism 74 includes a valve plug 82 which has four legs 78a to 78d separated by 90 degrees from each other in the circumferential direction and which is coated, for example, with an elastic member 80 such as natural rubber and synthetic rubber, and a stem 86 which is integrally joined to a hole 84 formed at an upper portion of the valve plug 82. The stem 86 is formed with a pair of expanded disk sections 88a, 88b which have a substantially identical diameter and which are separated from each other by a predetermined spacing distance. A packing 89 having a substantially v-shaped cross section, which is made of a flexible material, is installed between the pair of disk sections 88a, 88b. A plurality of holes 90, which function as orifices, are formed between the adjacent legs 78a to 78d of the valve plug 82 respectively.

Figure 3:
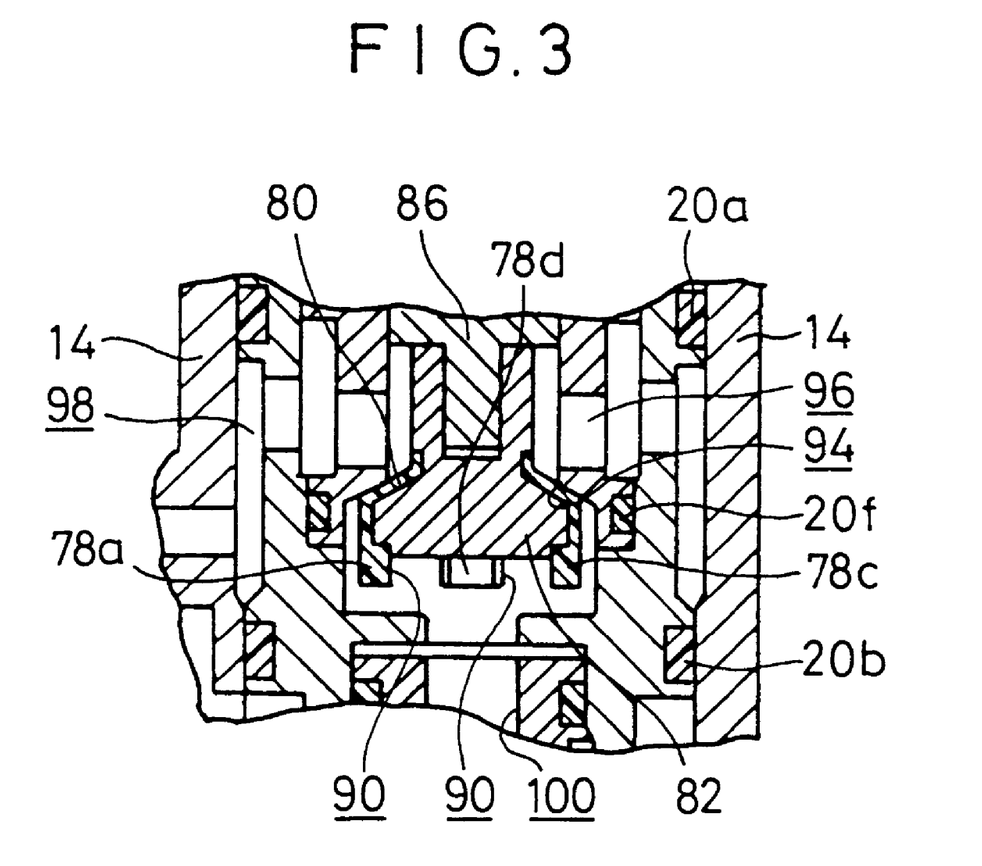
FIG. 3 shows, with partial omission, a vertical sectional view illustrating the valve-closed state in which a valve plug is displaced, and it is seated on a seat section.

In this embodiment, the valve mechanism 74 is in the valve-open state when the legs 78a to 78d of the valve plug 82 abut against the upper surface of an annular projection 92 formed on the inner wall surface of the first valve body 12 (see FIG. 2). The valve mechanism 74 is in the valve-closed state by being seated on a tapered hole 94 formed on the first valve body 12, against the resilient force of the spring member 76 (see FIG. 3). During this process, the hole 94 functions as the seat section for the valve plug 82. The hole 94 is designed such that the diameter of the packing 89 is substantially the same as the diameter of the hole 94.

As shown in FIG. 2, an annular third chamber 96 is formed at the joined portion between the valve plug 82 and the stem 86. The third chamber 96 is formed to make communication with the first chamber 52 via the fourth passage 56 and a fifth passage 98 having a bent configuration formed in the second valve body 14.

The check valve section 35 is installed to a lower portion of the hole of the first valve body 12, and it has, at a central portion, a cylindrical member 102 formed with a stepped through-hole 100 which extends in the axial direction. A fourth chamber 104 is formed between the inner wall surface of the first valve body 12 and the upper outer circumferential surface of the cylindrical member 102. A fifth chamber 106 is formed between the inner wall surface of the first valve body 12 and the lower outer circumferential surface of the cylindrical member 102.

The check valve 34, which has a tongue 108, is installed to an annular groove formed at an intermediate portion of the cylindrical member 102. The check valve 34 is designed as follows. That is, the communication between the fourth chamber 104 and the fifth chamber 106 is blocked by allowing the tongue 108 to make contact with the outer wall surface of the first valve body 12 in accordance with the action of the pressure fluid supplied from the side of the fourth chamber 104. On the other hand, when the tongue 108 is flexibly moved inwardly in accordance with the action of the pressure fluid supplied from the side of the fifth chamber 106, the fourth chamber 104 is communicated with the fifth chamber 106.

The fourth chamber 104 is formed to make communication with the stepped through-hole 40 of the flow rate-adjusting section 36 via the second passage 50 formed in the second valve body 14. The fifth chamber 106 is formed to make communication with the secondary port 30 via a hole 110 formed in the cylindrical member 102.

The pressure/flow rate control valve 10 according to this embodiment is basically constructed as described above. Next, its operation, function, and effect will be explained.

Figure 6:
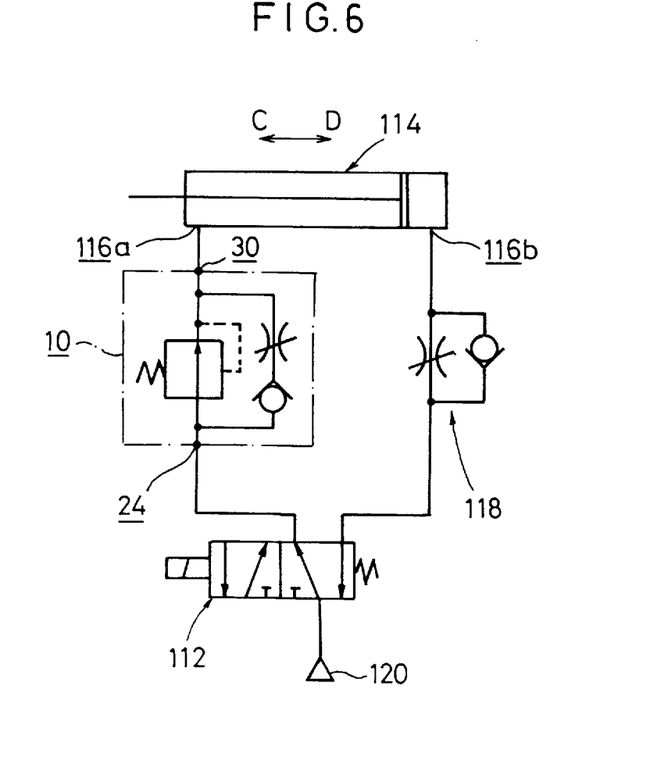
FIG. 6 shows a schematic arrangement of a fluid pressure circuit incorporated with the pressure/flow rate control valve shown in FIG. 1.

At first, a fluid pressure circuit as shown in FIG. 6 is constructed by using the pressure/flow rate control valve 10 according to this embodiment. That is, the primary port 24 of the pressure/flow rate control valve 10 is connected to a directional control valve 112 by using an unillustrated tube, and the secondary port 30 is connected to a first port 116a of a cylinder 114. Another control valve 118 is inserted between a second port 116b of the cylinder 114 and the directional control valve 112. A pressure fluid supply source 120 is connected to the directional control valve 112.

In the fluid pressure circuit constructed as described above, the pressure fluid (for example, compressed air) is supplied via the primary port 24 in accordance with the driving action of the pressure fluid supply source 120. In this situation, the valve plug 82 is in the valve-open state in which the legs 78a to 78d abut against the upper surface of the annular projection 92 in accordance with the resilient force of the spring member 76 (see FIG. 2).

The pressure fluid, which is supplied via the primary port 24, arrives at the first passage 26 and the first chamber 52, and it is introduced into the pressure-adjusting section 32 via the fourth passage 56 and the fifth passage 98 communicating with the first chamber 52. The pressure fluid is subjected to the pressure reduction when it passes through the clearance between the valve plug 82 and the hole 94 which functions as the seat section. The pressure fluid passes through the hole 90 formed between the adjacent legs 78a to 78d and through the stepped through-hole 100 of the cylindrical member 102. The pressure fluid is supplied to the first cylinder chamber of the cylinder 114 via the secondary port 30 and the port 116a.

The pressure fluid, which is supplied from the primary port 24, passes through the stepped through-hole 40 of the flow rate-adjusting section 36 via the first passage 26 and the first chamber 52, and it is introduced into the check valve section 35. However, the flow of the pressure fluid is blocked in accordance with the checking action of the check valve 34.

The secondary pressure, which is led from the secondary port 30, is balanced with the resilient force of the spring member 76 in the state in which the pressure fluid, which is throttled by the clearance between the valve plug 82 and the hole 94, is supplied to the first cylinder chamber of the cylinder 114 from the secondary port 30 as described above. The valve plug 82 is moved upwardly against the resilient force of the spring member 76, and it is seated on the seat section (hole 94). Accordingly, the flow of the pressure fluid is blocked.

That is, the diameter of the packing 89 installed to the stem 86 is set to be substantially the same as the diameter of the hole 94 which functions as the seat section. When the secondary pressure, which is led from the secondary port 30, becomes a balanced pressure corresponding to the resilient force of the spring member 76, then the valve plug 82 is moved upwardly, and it is seated on the seat section (hole 94). Therefore, the valve plug 82 is in the valve-closed state, and the flow of the pressure fluid is blocked (see FIG. 3). As a result, the first cylinder chamber of the cylinder 114 is in a state of being held at a predetermined pressure. The piston is displaced to the terminal end position in the direction of the arrow D in accordance with the action of the pressure fluid held at the predetermined pressure as described above.

Next, when the valve position of the directional control valve 112 is switched to displace the piston in a direction (direction of the arrow C) opposite to the above, the pressure fluid, which is introduced from the secondary port 30, presses the valve plug 82 upwardly against the resilient force of the spring member 76. Accordingly, the valve-closed state is maintained, in which the valve plug 82 is seated on the seat section.

Therefore, when the piston is displaced in the direction of the arrow C, the pressure fluid, which is supplied from the first cylinder chamber of the cylinder 114 and which passes through the secondary port 30, flows through the hole 110 of the cylindrical member 102 and the fifth chamber 106. The tongue 108 of the check valve 34 is flexibly moved inwardly thereby, while the pressure fluid passes through the check valve section 35. After that, the pressure fluid is introduced into the flow rate-adjusting section 36 via the second passage 50. The pressure fluid is throttled to have a predetermined flow rate in accordance with the preset spacing distance between the inner wall surface of the stepped through-hole 40 and the first end 48 of the adjusting screw member 42. Subsequently, the pressure fluid is led from the primary port 24 via the third passage 54 communicating with the stepped through-hole 40, the first chamber 52, and the first passage 26.

In this embodiment, the diameter of the packing 89 installed to the stem 86 is set to be substantially the same as the diameter of the hole 94 which functions as the seat section. The valve plug 82 is displaced when the secondary pressure, which is led from the secondary port 30, becomes the balanced pressure corresponding to the resilient force of the spring member 76. Therefore, in this embodiment, it is possible to operate the valve plug 82 by using the single spring member 76. The arrangement of the valve mechanism 74 is simplified, and the number of parts is reduced. Thus, it is possible to realize a smaller size and a lighter weight.

In this embodiment, the second passage 50 and the fourth passage 56, which are used to communicate and connect the pressure-adjusting section 32 and the flow rate-adjusting section 36 in the parallel manner respectively between the primary port 24 and the secondary port 30, have the cross-sectional configurations which are formed along the upper and lower contours 60, 64 of the second valve body 14 respectively. Accordingly, the wall thickness of the second valve body 14 is reduced, and it is possible to realize the small size and the light weight of the entire apparatus.

In this embodiment, the tube joint section 22 is provided to detachably connect the tube member such as the tube. Further, as for the leading direction of the tube member, the tube member is freely led in all directions. Accordingly, it is possible to improve the convenience when the pressure/flow rate control valve is used.

Figure 7:
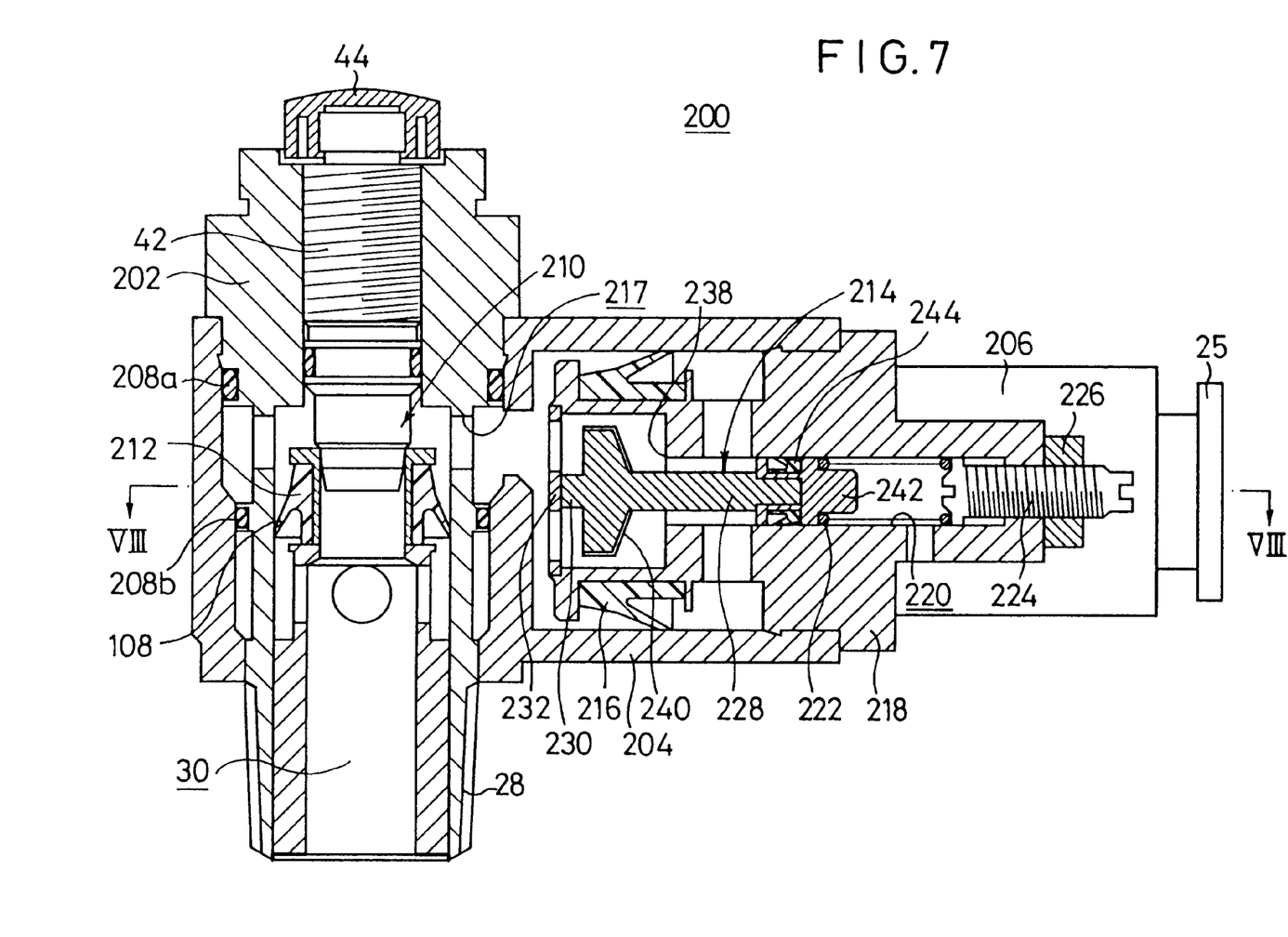
FIG. 7 shows a vertical sectional view taken in the axial direction illustrating a pressure/flow rate control valve according to another embodiment of the present invention.
Figure 8:
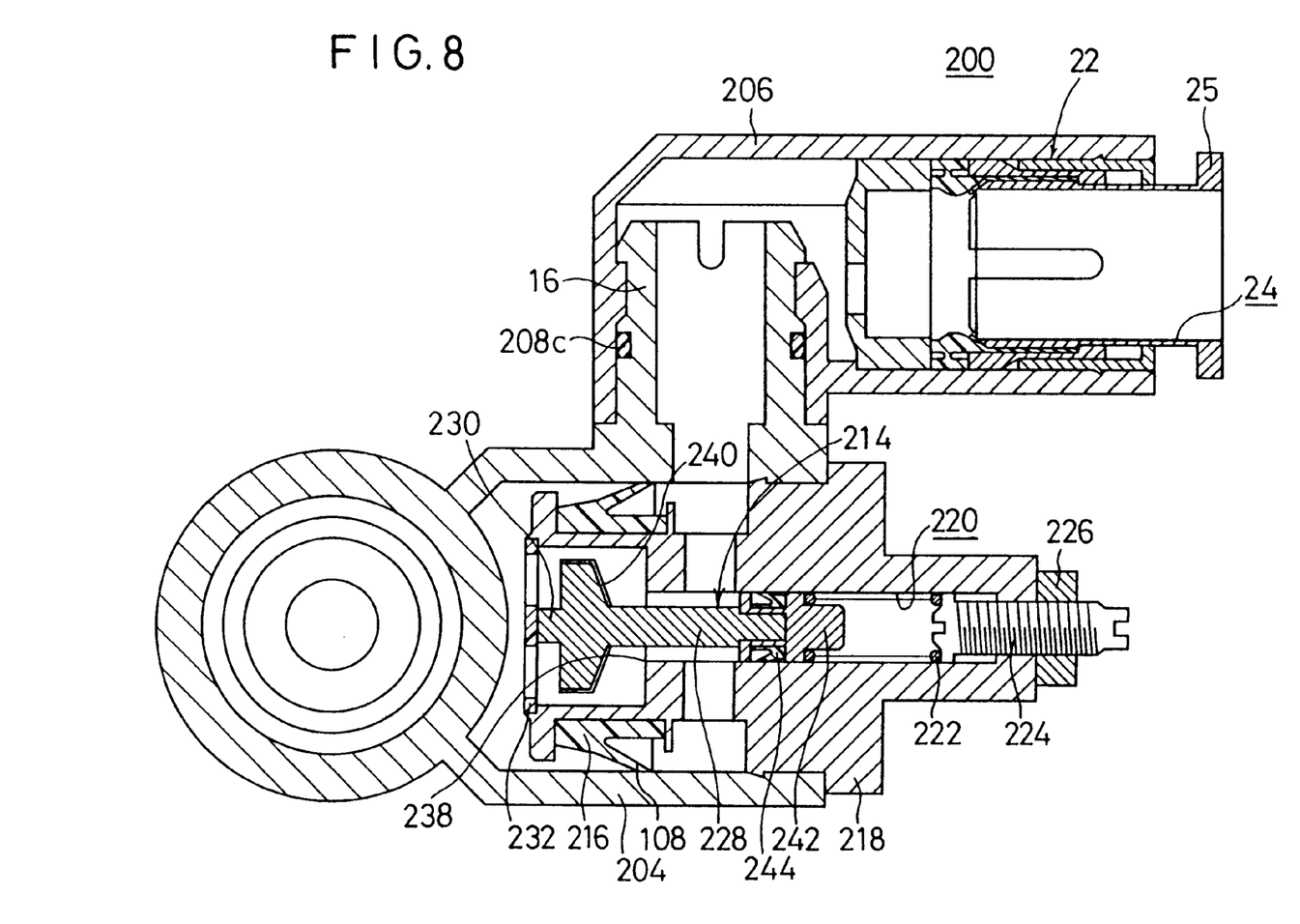
FIG. 8 shows a lateral sectional view taken along a line VIII—VIII shown in FIG. 7.

Next, a pressure/flow rate control valve 200 according to another embodiment of the present invention is shown in FIGS. 7 and 8. The same constitutive components as those of the embodiment described above are designated by the same reference numerals, detailed explanation of which will be omitted.

The pressure/flow rate control valve 200 according to the another embodiment comprises a second valve body 204 which is composed of two substantially cylindrical members integrally joined in directions substantially perpendicular to one another and which is rotatable about a center of rotation of the axis of an internally fitted first valve body 202 having a cylindrical configuration, and a third valve body 206 which is joined rotatably about a center of rotation of a projection 16 of the second valve body 204.

Ring-shaped first and second seal members 208a, 208b are installed to annular grooves on the outer circumferential surface of the first valve body 202 (see FIG. 7). A ring-shaped third seal member 208c is installed to an annular groove at the joined portion between the second valve body 204 and the third valve body 206 (see FIG. 8). A tube joint section 22, which is connected to a pressure fluid supply source via an unillustrated tube, is provided at one end of the third valve body 206.

Figure 9:
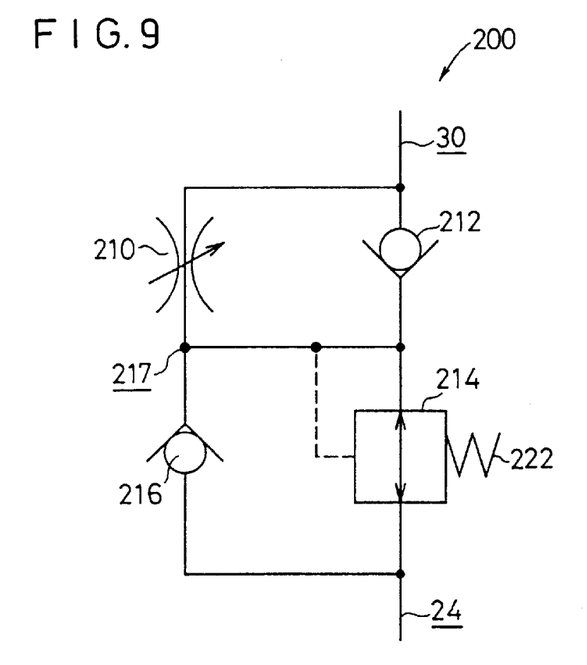
FIG. 9 shows a circuit arrangement of the pressure/flow rate control valve shown in FIG. 7.

A flow rate-adjusting section 210 for adjusting the flow rate of the pressure fluid supplied from a primary port 24, and a first check valve 212 are provided substantially coaxially at the inside of the first valve body 202. A pressure-adjusting section 214 and a second check valve 216 are provided coaxially in a direction substantially perpendicular to the axis of the first valve body 202 at the inside of the second valve body 204. A communication passage 217 for making communication between the flow rate-adjusting section 210 and the pressure-adjusting section 214 is formed at the joined portion between the first valve body 202 and the second valve body 204 (see FIG. 9).

The pressure-adjusting section 214 includes a cap member 218 which is joined to an opening of the second valve body 204, a pressure adjusting screw 224 which is engaged with a thread portion of a through-hole 220 formed in the cap member 218, for setting the resilient force of a spring member 222 as described later on by increasing or decreasing the screwing amount into the thread portion, and a lock nut 226 for fixing the pressure adjusting screw 224 at a predetermined position.

The pressure-adjusting section 214 includes a valve plug 228 which is arranged coaxially with the pressure adjusting screw 224, a valve stopper 232 for making abutment against a single leg 230 formed at one end of the valve plug 228, the spring member 222 which is inserted between the pressure adjusting screw 224 and the valve plug 228, for pressing the valve plug 228 toward the valve stopper 232 in accordance with the action of the resilient force, and the second check valve 216 for preventing the pressure fluid supplied from the primary port 24 from flowing toward a secondary port 30.

Figure 10:
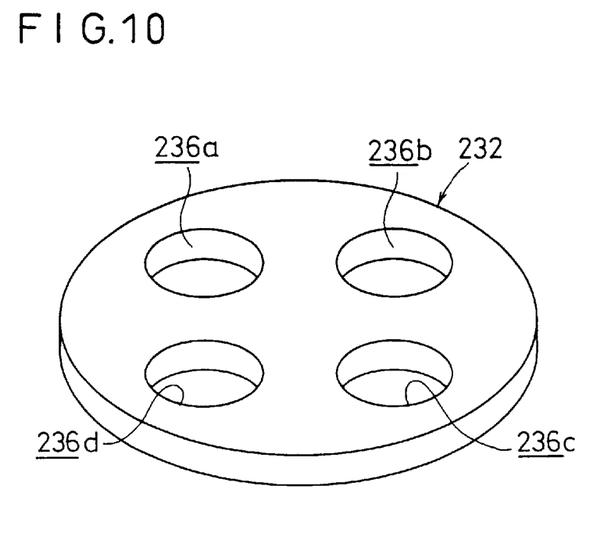
FIG. 10 shows a perspective view illustrating a valve stopper for constructing the pressure/flow rate control valve shown in FIG. 7.

The valve stopper 232 is formed to have a substantially disk-shaped configuration. As shown in FIG. 10, the valve stopper 232 is provided with a plurality of circular holes 236a to 236d with their centers disposed concentrically. The valve plug 228 abuts against a substantially central portion of the valve stopper 232 to regulate the displacement thereof.

The valve plug 228 includes a tapered surface 240 which is coated with an elastic member such as rubber, for being seated on a seat section 238 against the resilient force of the spring member 222, a stem 242 which is joined integrally and coaxially with the valve plug 228, and a packing 244 which is installed to an annular groove on the stem 242.

In this arrangement, the diameter of the packing 244 installed to the stem 242 is formed to be substantially the same as the diameter of the seat section 238. The secondary pressure, which is led from the secondary port 30, is balanced corresponding to the resilient force of the spring member 222. Accordingly, the valve plug 228 is displaced in the direction to make separation from the valve stopper 232, and it is seated on the seat section 238.

The pressure/flow rate control valve 200 according to the another embodiment is basically constructed as described above. Next, its operation, function, and effect will be explained.

Figure 11:
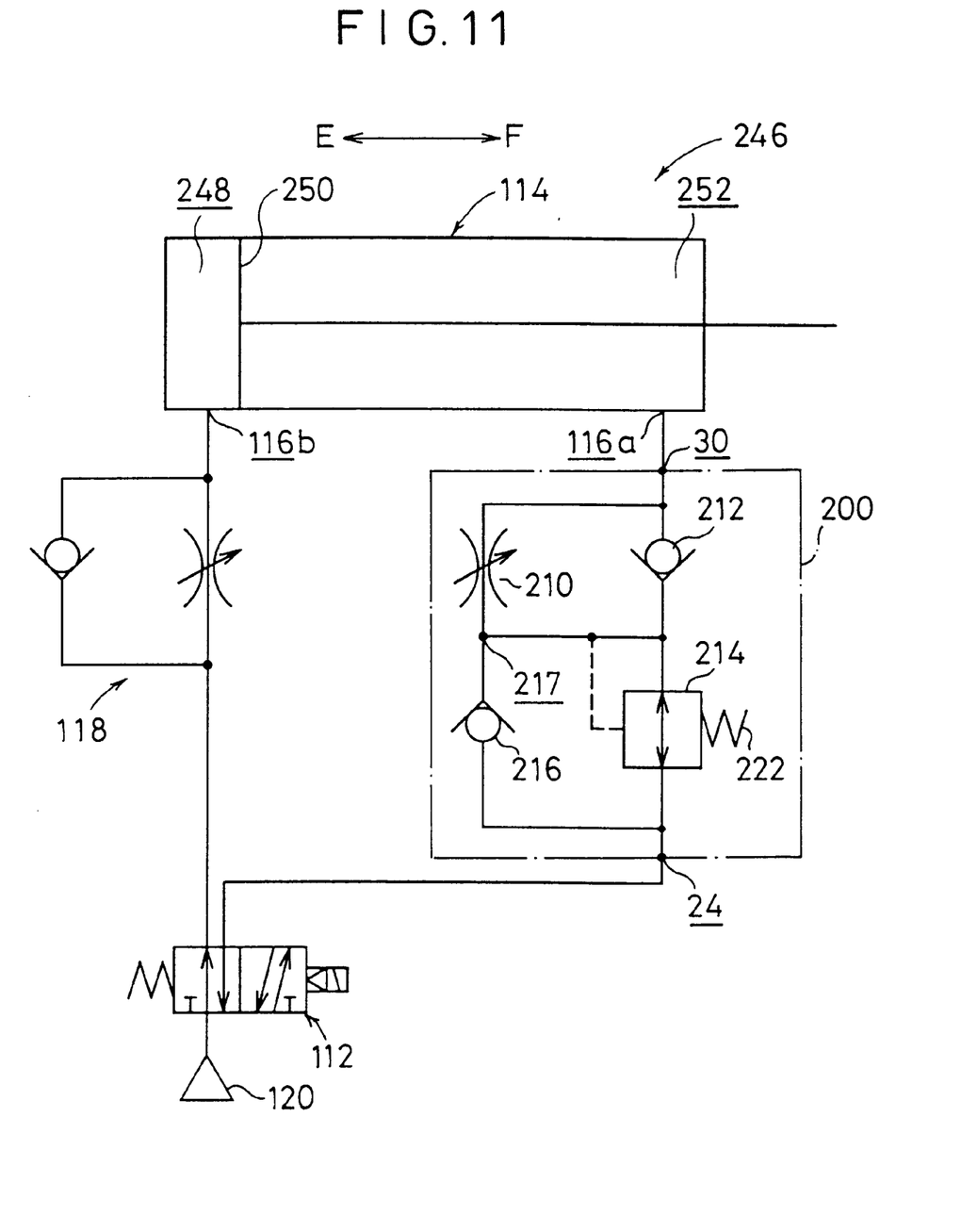
FIG. 11 shows a circuit arrangement of the meter-out control incorporated with the pressure/flow rate control valve shown in FIG. 7.

At first, as shown in FIG. 11, a fluid pressure circuit 246 for performing the meter-out control is constructed with the pressure/flow rate control valve 200 according to the another embodiment. That is, the primary port 24 of the pressure/flow rate control valve 200 is connected to a directional control valve 112 with an unillustrated tube, and the secondary port 30 is connected to a first port 116a of a cylinder 114. Another control valve 118 is inserted between the directional control valve 112 and a second port 116b of the cylinder 114. A pressure fluid supply source 120 is connected to the directional control valve 112.

When the pressure fluid is supplied to a cylinder chamber 248 disposed on the head side by the aid of the another control valve 118 in accordance with the action of the driving of the pressure fluid supply source 120 in the fluid pressure circuit 246 constructed as described above, a piston 250 is displaced in the direction of the arrow F. The pressure fluid, which is led from a cylinder chamber 252 disposed on the rod side, is supplied to the secondary port 30 of the pressure/flow rate control valve 200. The pressure fluid is throttled to have a predetermined flow rate by the aid of the flow rate-adjusting section 210. After that, the pressure fluid is introduced into the pressure-adjusting section 214 via the communication passage 217.

The pressure fluid, which is introduced into the pressure-adjusting section 214, passes through the holes 236a to 236d of the valve stopper 232. The pressure fluid flows through the space between the seat section 238 and the tapered surface 240 of the valve plug 228, and it is led from the primary port 24. In this process, the secondary pressure, which is supplied from the secondary port 30, is balanced corresponding to the resilient force of the spring member 222. Accordingly, the valve plug 228 is seated on the seat section 238 to give the valve-closed state. This process is performed in the same manner as that of the foregoing embodiment. A part of the pressure fluid throttled to have the predetermined flow rate by the flow rate-adjusting section 210 flows while inwardly bending the tongue 108 of the second check valve 216, and it is led from the primary port 24.

In the another embodiment, for example, even when the pressure of the cylinder chamber 252 on the rod side is lower than the preset pressure set by the pressure-adjusting screw 224, then the pressure fluid, which is introduced via the communication passage 217, passes through the second check valve 216, and it is led from the primary port 24. The another embodiment is advantageous in that the speed control can be continuously performed for the piston 250 even in such a case.

Figure 12:
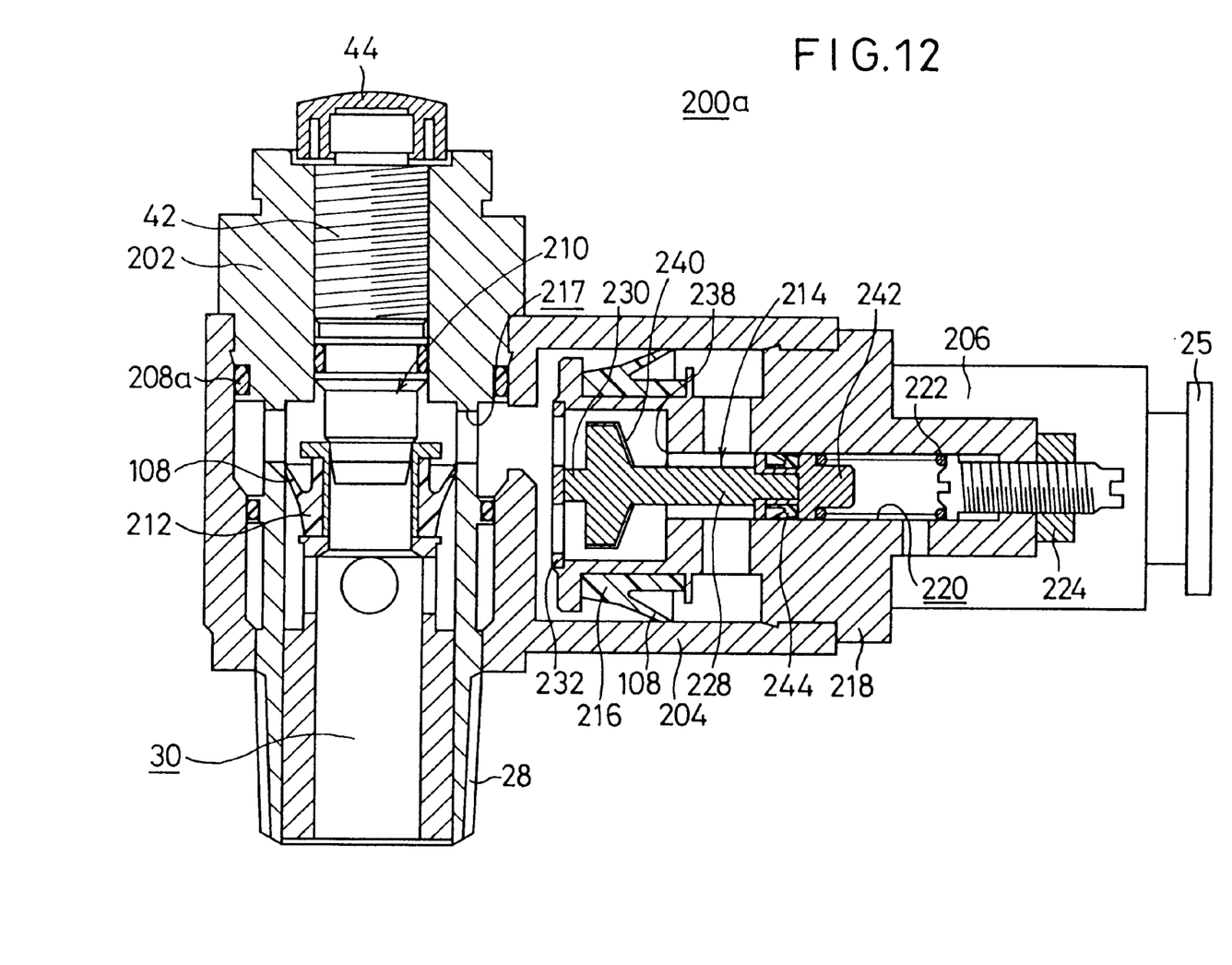
FIG. 12 shows a vertical sectional view taken in the axial direction illustrating a pressure/flow rate control valve according to still another embodiment of the present invention.
Figure 13:
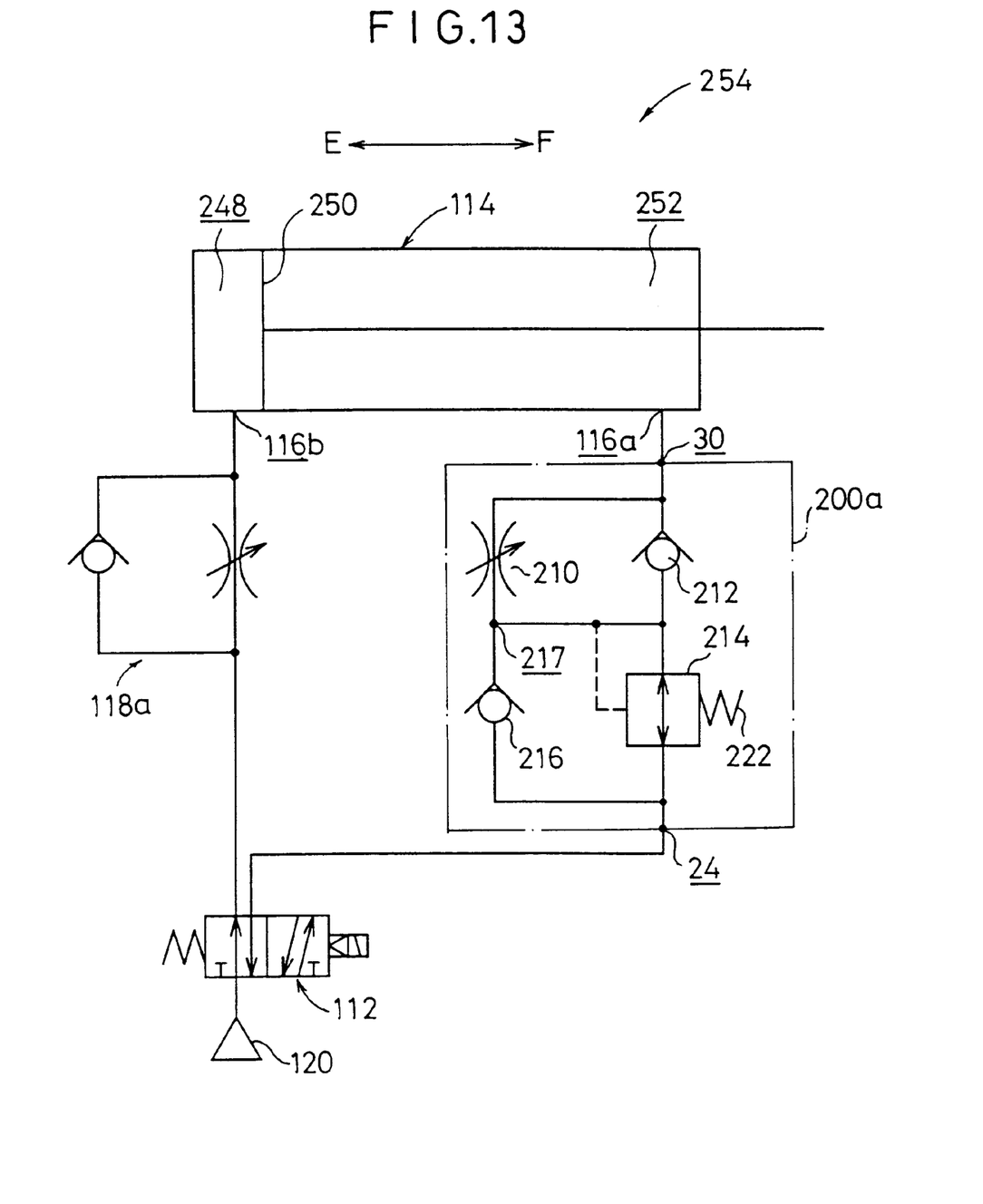
FIG. 13 shows a circuit arrangement of the meter-in control incorporated with the pressure/flow rate control valve shown in FIG. 12.

Further, as shown in FIG. 12, a pressure/flow rate control valve 200a according to still another embodiment is constructed, in which the first check valve 212 is assembled in the direction opposite to the above so that the checking action is exerted in the direction opposite to the above. Accordingly, the present invention is also applicable to a fluid pressure circuit 254 based on the meter-in control (see FIG. 13). In this arrangement, the checking direction in the another control valve 118a is set to be the direction opposite to the above.

As described above, the direction of the first check valve 212 is selected from any one of the directions upon the assembling. Thus, it is possible to obtain the pressure/flow rate control valves 200, 200*a* capable of being applied to any one of the fluid pressure circuit 246 based on the meter-out control and the fluid pressure circuit 254 based on the meter-in control.

What is claimed is:

1. A pressure/flow rate control valve comprising:
    a first valve body formed to have a cylindrical configuration with a secondary port formed at a first end;
    a second valve body including two cylindrical members joined integrally in directions substantially perpendicular to one another, said second valve body being rotatable about a center of rotation of said first valve body;
    a third valve body formed to have a substantially bent L-shaped configuration, said third valve body being rotatable about a center of rotation of a projection of said second valve body;
    a tube joint section arranged in said third valve body and provided with a tube joint for detachably connecting a tube member to a primary port;
    a flow rate-adjusting section arranged in said second valve body, for adjusting a pressure fluid flowing through a passage communicating with said primary port to have a predetermined flow rate;
    a pressure-adjusting section arranged on a first end side of said first valve body, for adjusting a pressure of said pressure fluid introduced via a first communication passage communicating with said primary port; and
    a check valve section arranged on a second end side of said first valve body, for allowing only said pressure fluid directed from said secondary port to said flow rate-adjusting section to flow therethrough via a second communication passage, wherein:
    said pressure-adjusting section includes a valve plug for reducing said pressure of said pressure fluid depending on a clearance between a seat section and itself, a stem installed with a packing, for making displacement integrally with said valve plug, and a spring member fastened to a first end of said stem, for pressing said valve plug toward an annular projection formed on an inner wall surface of said first valve body; and when a secondary pressure led from said secondary port is balanced with a resilient force of said spring member, a valve-closed state is given, in which said valve plug is seated on said seat section.

2. The pressure/flow rate control valve according to claim 1, wherein said primary port is provided at said tube joint section to which said tube member is detachably connected, and said tube member is attached detachably in all directions.

3. The pressure/flow rate control valve according to claim 1, wherein said first communication passage and said second communication passage are formed to have cross-sectional configurations such that they are separated from each other by a predetermined spacing distance corresponding to a contour on a first end side and a contour on a second end side of said second valve body respectively.

4. The pressure/flow rate control valve according to claim 1, wherein a diameter of said packing installed to said stem is set to be substantially the same as a diameter of a hole of said second valve body as said seat section for said valve plug.

5. The pressure/flow rate control valve according to claim 1, wherein said pressure-adjusting section and said check valve section are arranged substantially coaxially in an axial direction at the inside of said first valve body.

6. A pressure/flow rate control valve comprising:
    a main valve body having a primary port and a secondary port;
    a flow rate-adjusting section provided with a first check valve for blocking flow of a pressure fluid toward said primary port, for adjusting said pressure fluid introduced from said secondary port to have a predetermined flow rate; and
    a pressure-adjusting section provided with a second check valve for blocking flow of said pressure fluid toward said secondary port, for reducing a pressure of said pressure fluid introduced from said primary port to be a predetermined pressure so that said pressure fluid is led from said secondary port, wherein:
    said pressure/flow rate control valve is provided with a communication passage for making mutual communication between said pressure-adjusting section and said flow rate-adjusting section.

7. The pressure/flow rate control valve according to claim 6, wherein any one of meter-out control and meter-in control is selectable by changing a checking direction of said first check valve.

* * * * *